United States Patent Office 2,839,545
Patented June 17, 1958

2,839,545

PROCESSES OF PHOSPHORYLATING PHOSPHATIDES AND PRODUCTS THEREOF

Douglas J. Hennessy, Teaneck, N. J., and Raymond J. Moshy, New York, N. Y., assignors to American Lecithin Company, Inc., Woodside, New York, a corporation of Ohio No Drawing. Application November 24, 1953
Serial No. 394,220

7 Claims. (Cl. 260—403)

The present invention relates to processes of enhancing phosphatides and similar organic materials by phosphorylation and to the products thereof.

The present invention will be particularly described in its application to phosphatides, such as soya lecithin, which have double or unsaturated or hydroxylic or other reactive bonds which render them subject to destruction or charring when treated with strongly acidic reagents.

It is among the particular objects of the present invention to develop a procedure of enhancing organic compounds, such as phosphatides or lecithin, which will enable increase in their miscibility in various solvents and particularly in aqueous compositions or water and at the same time substantially preserve and retain the organic complex or molecular structure without either substantial destruction, charring or breaking down into simpler or less complex, molecular structures or polymerization into tarry or gummy, more complex structures.

Commercial lecithin either in substantially oil-free form or in its commercial composition in which there is a mixture of about 67% of lecithin and associated phosphatides, cephalin and inositol phosphatide chiefly, and 33% of soya bean oil often cannot be conveniently utilized because it is difficult to disperse it or dissolve it in water or aqueous media.

Commercial lecithin normally will not readily mix in aqueous fluids and there is considerable difficulty in obtaining dispersions thereof, and because of its resistance to miscibility with water or aqueous liquids, the possibilities of its usefulness in soluble cutting or grinding oils, in the preparation of aqueous dispersions and stable emulsions and in the treatment of textiles or in processes of pigment wetting are quite limited.

Vegetable lecithin or natural phosphatides normally are very complex mixtures, particularly when derived from soya beans or even corn, peanuts and other seed material, and said mixtures are composed of the phosphatide lecithin, some fat usually in the form of soya bean or other glyceride oil, lipositol, cephalin, carbohydrate, sterols and the like.

Wherever lecithin is referred to hereinafter, it will be understood to include also other phosphatides, such as cephalin and lipositol and similar mixtures or related organic compositions having chemical structural features similar to those present in lecithin.

It has not been found readily possible to treat this mixture to enhance its solubility or water miscibility because of the reactivity or sensitivity of the lecithin and related components and because of its tendency to degrade or break down or polymerize into undesirable products and particularly because of excessive charring.

It is among the objects of the present invention to provide a treatment for lecithin either in crude or oil-free condition, in which the miscibility and other dispersibility of the lecithin is greatly increased without substantial degradation, charring, breaking down or polymerization and without excessive splitting or destruction at the double bonds or other reactive linkages therein.

Another object of the present invention is to provide an improved, solubilized lecithin retaining in substantially full strength its oily and lubricating properties and its surface contact effect, while at the same time being more dispersible in water to provide emulsions and aqueous dispersions of enhanced value without the necessity of utilizing expensive, synthetic emulsifying agents and have increased sequestering power.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most suitable, according to one embodiment of the present invention, to treat the mixed phosphatides or the commercial lecithin composition containing glyceride oil, or an oil-free commercial lecithin, with water soluble organic oxidizing or hydroxylating agents which will have a weak or limited oxidizing or hydroxylating action thereon, after which phosphorylation is brought about.

Among the preferred oxidizing agents of this character are various water soluble per- fatty acid compounds. Although many types of per- compounds may be utilized, such as per- lactic acid or perpropionic acid, in general, per- acetic acid is employed under such temperature and concentration conditions, as to give a limited chemical reaction upon the active bonds of lecithin or of other similar organic compositions.

Although this peracid treatment or weak oxidizing treatment in itself and by itself gives unusual results, satisfactory for certain purposes, it has been found that even more active enhancement of lecithin or other organic compositions may be obtained by a combined treatment with an agent capable of introducing phospho acid groups into the complex molecule of the lecithin.

It has been found most satisfactory in the present invention to employ relatively strong, inorganic acid anhydrides, preferably phosphoric acid anhydride, which may have been so treated or in such combinations or in the presence of such reagents that they will not exert too strong an effect upon the complex molecule, and will not tend to char or cause disintegration of the complex molecule. The phosphorus pentoxide is used either in the presence or absence of an organic solvent.

The phosphorylation may take place without the previous weak oxidizing or per treatment, especially when the solvents are used, but in the preferred procedure, according to the present invention, the oxidizing treatment is followed by the introduction of phospho- groups without the presence of solvent.

As an alternative, both the oxidizing and phosphorylation operations may take place simultaneously or in the same reaction mixture, or the oxidizing treatment may precede and accompany, accompany and follow or precede, accompany and follow the phosphorylation.

Desirably, much less than 50% of the double bonds or unsaturated linkages are lost in the treatments as determined by iodine number evaluation.

In the preferred procedure about 15% to 20% of the double bonds are saturated.

Desirably, the phosphorylation takes place in the absence of significant concentrations of water.

The reaction with a small amount of a low molecular weight, water soluble organic per- acid or perfatty acid followed by treatment with phosphoric acid anhydride or phosphorus pentoxide, may also be done in the presence of an organic solvent.

The lecithin or phosphatides may be treated in the form of a liquid lecithin which is a type of commercial lecithin containing 2% to 5% added fatty acid, such as stearic acid or soya bean acids to increase its fluidity; or in the form of a de-oiled lecithin from which the residual soya bean oil has been largely removed, or in the form of tank bottoms rich in phosphatides.

Generally, the per- treatment and phosphorylation are accomplished by successive treatments with 2 to 10 parts by weight of 40% per- acetic acid and 5 to 35 parts by weight of solid phosphorus pentoxide for every 100 parts of commercial lecithin containing about 60% to 70% mixed phosphatides.

*Example 1*

To 100 parts of liquid commercial lecithin is added 4 parts by weight of 40% per- acetic acid with stirring in a jacketed Hobart type beater and accompanied by cooling to maintain the temperature between 20° to 50° C.

After one hour, 10 parts by weight of powdered phosphorus pentoxide are added in ten portions with stirring and cooling to maintain the temperature between 10° to 30° C.

After one hour the reaction product is neutralized by careful addition to 60% KOH solution with stirring and cooling to maintain a temperature of about 20° C.

The amount of KOH solution added is that which is necessary so that a sample of the neutralized material made up to a 5% dispersion in water will have a pH between 6.5 and 7.0.

Other bases or alkalies may be employed for the neutralization, among which are ammonia gas under pressure, concentrated ammonia water, 50% sodium hydroxide, a 60% aqueous slurry of fine crystals of hydrated barium hydroxide, and organic bases such as the ethanol-amines, the isopropanolamines, morpholine and dicylohexylamine.

*Example 2*

The process is the same as in Example 1 until one hour after the last portion of phosphorus pentoxide has been added. The product is then mixed with five times its weight of water and the water phase is removed. The washing is repeated with removal of wash water by finally heating to 85° to 100° C. to cause separation of the water.

The product is then neutralized in the manner described in Example 1 after which the water may be removed by vacuum drying of the product. The product obtained in this manner has a lower salt content than that obtained in Example 1.

The quantities of 40% per- acetic acid used in Examples 1 and 2 may be varied from 2% to 10%, or even higher. The amount of phosphorus pentoxide may be varied from 5% to 35%.

Usually the larger amounts of per- acetic acid are used when the larger quantities of phosphorus pentoxide are to be employed, as is evident from the following table:

| 40% Per- acetic acid, parts by weight | $P_2O_5$, parts by weight |
| --- | --- |
| 2 | 5 to 10 |
| 4 | 10 to 20 |
| 6 | 15 to 25 |
| 8 | 20 to 30 |
| 10 | 25 to 35 | the per-acetic acid and the phosphorus pentoxide in the above proportions are successively added to, mixed with and reacted with 100 parts by weight of commercial lecithin with a content of 60% to 70% mixed phosphatides. The use of solvent such as ethylene dichloride is particularly advantageous when the phosphorus pentoxide ($P_2O_5$) exceeds 20 parts by weight.

*Example 3*

10% by weight of phosphorus pentoxide in twice its weight of dioxane is added to commercial lecithin containing 3% of soya bean fatty acids, with vigorous mixing. Temperature is kept between 20° C. and 30° C. The product is neutralized with a suitable organic or inorganic base and if desired, the solvent removed in vacuo.

*Example 4*

To prepare a treated lecithin, 100 parts of liquid commercial lecithin is reacted with 5 parts of 40% per- acetic acid.

To this reaction mixture there is added with good mixing an ethylene dichloride-phosphorus pentoxide combination which contains about 20 parts of phosphorus pentoxide in each 40 parts of ethylene dichloride, all parts being by weight.

This ethylene dichloride-phosphorus pentoxide combination is produced by adding phosphorus pentoxide in small quantities to the ethylene dichloride which is chilled with thorough stirring.

After the ethylene dichloride and phosphorus pentoxide has completed its action upon the lecithin, the mixture is neutralized with an organic or inorganic base.

During this treatment the temperature should be kept below 45° C. and after all of the ethylene dichloride-phosphorus pentoxide has been added, the reaction mixture is brought to room temperature with external cooling.

The phosphorylated mixtures are desirably neutralized with 60% potassium hydroxide to pH 6.5 to 7. The pH is measured on a 5% dispersion of the material in water at 25°. Water and solvent may be removed by vacuum drying if desired.

Among the various alkalies which may be employed for neutralization are powdered anhydrous potassium or sodium hydroxide, 50% sodium or potassium hydroxide solution, powdered hydrated or anhydrous barium hydroxide, a 60% aqueous slurry of barium hydroxide, concentrated or 28% ammonium hydroxide, anhydrous ammonia gas under pressure, organic amines such as triethanolamine, triethylamine or dicyclohexyl amine.

In general, in the above example, neutralization may be carried out by use of a suitable inorganic or organic base either with or without water as a solvent for the base.

In a preferred form of the invention, phosphorus pentoxide powder is added after the reaction mixture resulting from the treatment of commercial lecithin with a per- fatty acid, preferably per- acetic acid.

The neutralized per- acetic acid treated and phosphorylated products generally were viscous, golden brown to light brown and possessed agreeable odors and were water dispersible.

The preliminary per- treatment may be omitted but the compositions produced are less water dispersible and are darker in color and have a less agreeable odor, after neutralization with sodium or potassium hydroxide.

Generally a per- treatment with 2% or 4% or 8% of per- acetic acid should precede the treatment of the commercial lecithin with 5% to 25% of phosphorus pentoxide by itself or 20% to 35% of the composition of phosphorus pentoxide and an organic solvent, such as ethylene chloride, dioxane or polyethers.

In the above procedures other phosphorylating agents may be employed, such as halogenated compounds, and other water soluble per- acids.

The final product is probably a hydrate or a hydroxylate, an epoxylate and phosphate of the original lecithin material, with use of increased proportion of phosphorus pentoxide resulting in more of the phosphorylation and less of the hydroxylation.

Based upon an assumption that there are 1½ double bonds per molecule of the lecithin, the above process will result in hydroxylation, epoxylation and phosphorylation of about ¼ to ⅓ of these double bonds, although this may range from 1/10 to ½ of the double bonds. Preferably, about 5% to 10% of the double bonds are converted into hydroxylated, epoxylated or phosphated compounds. If desired, the lecithin before treatment may be subjected to a high pressure processing with ethylene oxide in the presence of such catalysts as sodium methylate or potassium ethylate.

This may be followed by the phosphorylation treatment.

Instead of lecithin it is possible to treat phosphatides or lecithin containing crude, vegetable, animal and marine oils, tank bottoms or vegetable oil residues, unsaturated fatty oils, and lipoids.

The modified lecithin produced as above may be used in lubricating oils as a detergent and also to enhance the film strength of various oils.

The product emulsifies more readily with water and the water emulsion is not as readily precipitated in the presence of an acid.

The addition of a small percentage of the above modified phospho- phosphatides tends to increase the sweat point of hard vegetable butter as contrasted to ordinary lecithin, which lowers said sweat point. The product may also be utilized in fat liquors employed in the tanning of leather.

The enhanced lecithin has greatly increased stabilizing effect and has better oily properties and is more readily miscible both in oil and water compositions or emulsions.

The phosphorylated lecithin may be readily added to bakery products to improve the blending and to favorably influence the quality of the finished products.

In some instances, part or all the phosphorus oxides may be replaced by oxychlorides of phosphorus and less preferably by phosphorus chlorides. It is also possible to use phosphorus sulfides.

Phosphorus pentasulfide or thiophosphoryl chloride may be used to obtain thiophosphorylation and phosphorus oxychloride may be used to obtain phosphorylation together with or separately from phosphorus pentoxide.

Less satisfactorily, instead of using per- acetic acid, it is possible to use a mixture of 30% to 90% hydrogen peroxide with glacial acetic acid containing catalytic amounts of sulphuric acid and also acetic anhydride equivalent to the water present in the peroxide.

The important feature of the present invention resides in the fact that introduction of the phospho-groups subsequent to the per- treatment will produce a new phosphatide or lecithin product, which is particularly suitable after neutralization in many fields and for many purposes.

Together with the phospho-groups it is also possible to introduce sulpho-groups by inclusion of sulpho trioxide in solvent.

The lecithin appears to be more water miscible and water dispersible and after neutralization it has a better odor, flavor and consistency.

The preferred treatment involves successive processing with per- acetic acid, phosphorus pentoxide and neutralization.

The phosphorylated phosphatide is much more miscible in glycerine and invert sugar solutions.

In the above treatment the use of an organic solvent is not essential and the vegetable lecithin or phosphatide may be treated with the per- compound and the phosphorus pentoxide followed by neutralization without the presence of organic solvent, keeping the temperature below 50° C.

The product may be conveniently filled into drums and has high stability when filled into drums.

In all cases it has been found preferable to neutralize the phosphorylate to about 7 after treatment.

The phospho-phosphatide products obtained above may be added to liquid soap and to alkyl and aryl sulfonate solutions in small percentages without adversely affecting the appearance or foaming characteristics.

The phosphatides may also be used in crude oils containing the same or in the form of tank settlings or tank bottoms.

Where a mixture of hydrogen peroxide and glacial acetic acid is employed, to accomplish the initial per- treatment in the less preferred procedure, a small amount of sulfuric acid should be present as a catalyst.

As many changes could be made in the above lecithin compositions and processes of producing the same, and many widely different embodiments of this invention could be made without departing from the scope of the claims, it is intended that all matter contained in the above description shall be interpreted as illustrative and not in a limited sense.

Having now particularly described and ascertained the nature of the invention, and in what manner the same is to be performed, what is claimed is:

1. A process of producing peroxidized, neutralized, viscous water-dispersible, golden to light brown colored, phosphorylated phosphatides having a reduced number of double bonds per molecule by first treating the phosphatide with an organic peracid selected from the group consisting of peracetic, perpropionic and perlactic acids to produce a modified phosphatide susceptible to phosphorylation without charring, followed by phosphorylating the phosphatide with phosphorus pentoxide to produce a phosphatide having greatly increased miscibility in water and retaining its phosphatide molecular structure without substantial destruction and charring.

2. The process of claim 1, the phosphatide used being in the form of commercial lecithin containing about 33% of soya bean oil and about 2 to 10 parts by weight of 40% peracid and 5 to 35 parts by weight of phosphorus pentoxide being used for each 100 parts by weight of commercial lechithin.

3. The process of claim 1, in which the treatment with the organic peracid is accomplished at a temperature of between 20 to 50° C. and the treatment with the phosphorus pentoxide is accomplished at a temperature between 10 to 30° C. and the final product is neutralized by caustic alkali.

4. The process of claim 1, said phosphorus pentoxide being used in the presence of an organic solvent selected from the group consisting of ethylene chloride, dioxane and polyethers.

5. The neutralized, peracid-treated and phosphorylated viscous, golden to light brown, water-dispersible phosphatide having a reduced number of double bonds per molecule which is readily emulsifiable in water and not readily precipitable in the presence of acid produced in accordance with the process of claim 1.

6. A phosphorylated, peroxidized phosphatide having less than 50% of the original number of double bonds and only about 15% to 20% of the double bonds of the original phosphatide, being highly miscible in water and aqueous compositions and retaining substantially its original complex molecular structure without any destruction, charring and breakdown into tarry and gummy products, produced by successive treatments of the phosphatide with a peracid selected from the group consisting of perpropionic, peracetic and perlactic acids followed by treatment with phosphorus pentoxide in accordance with the process of claim 1.

7. A process of producing a non-charring, relatively highly saturated, phosphorylated, peroxidized phosphatide which comprises peroxidizing 100 parts by weight of commercial lecithin containing 60 to 70% mixed phosphatides with 2 to 10 parts by weight of 40% peracetic acid and then phosphorylating the peroxidized commercial lecithin with 5 to 35 parts by weight of phosphorus pentoxide.

References Cited in the file of this patent

UNITED STATES PATENTS

| | | |
|---|---|---|
| 2,026,785 | Harris | Jan. 7, 1936 |
| 2,090,537 | Lund | Aug. 17, 1937 |
| 2,355,081 | Julian et al. | Aug. 8, 1944 |
| 2,391,462 | Julian et al. | Dec. 25, 1945 |
| 2,445,948 | Wittcoff | July 27, 1948 |
| 2,629,662 | Julian et al. | Feb. 24, 1953 |